April 10, 1951 R. J. ANDERSON 2,548,511
ELECTRIC TOASTER
Filed Dec. 13, 1948 3 Sheets-Sheet 3

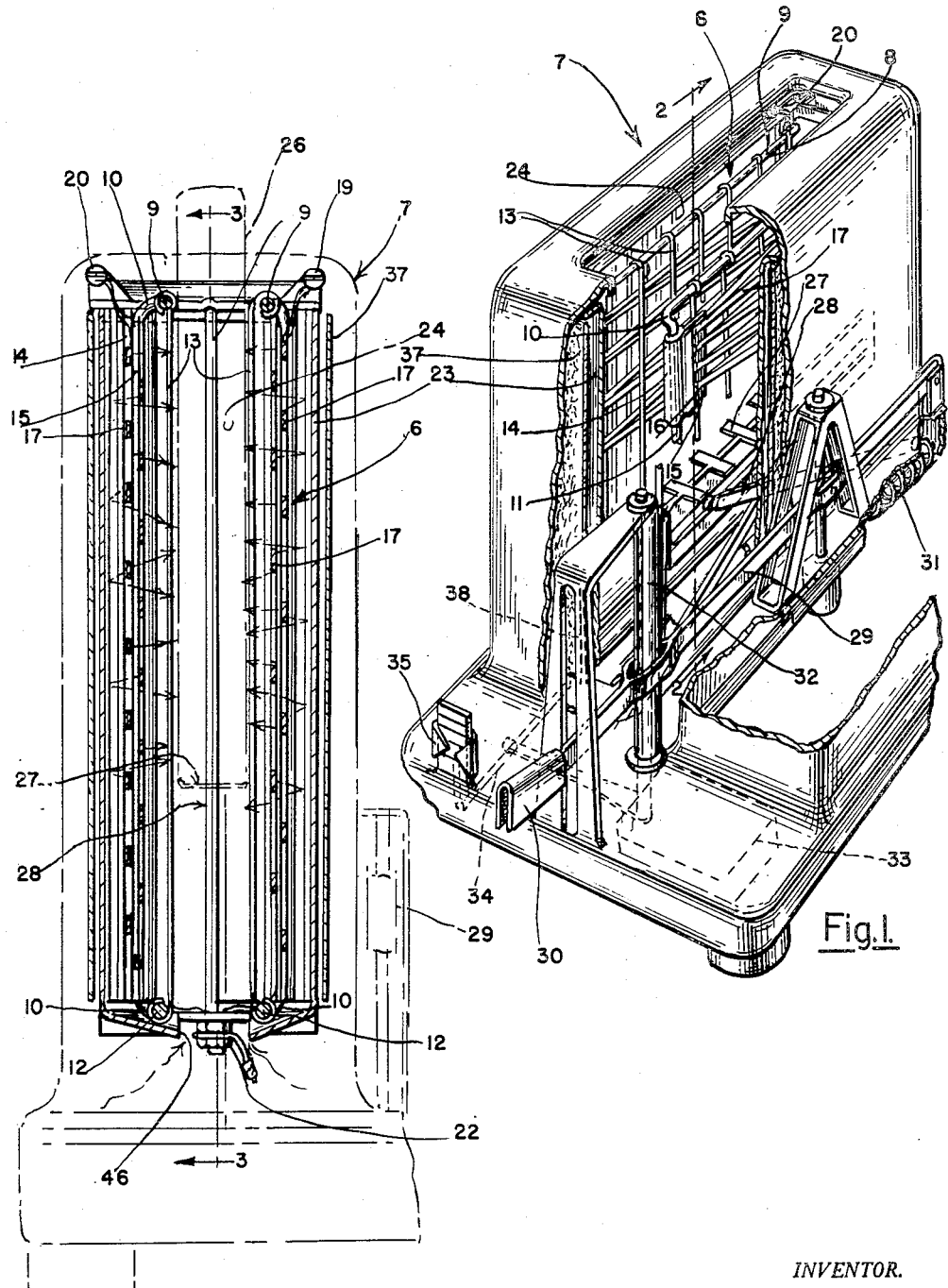

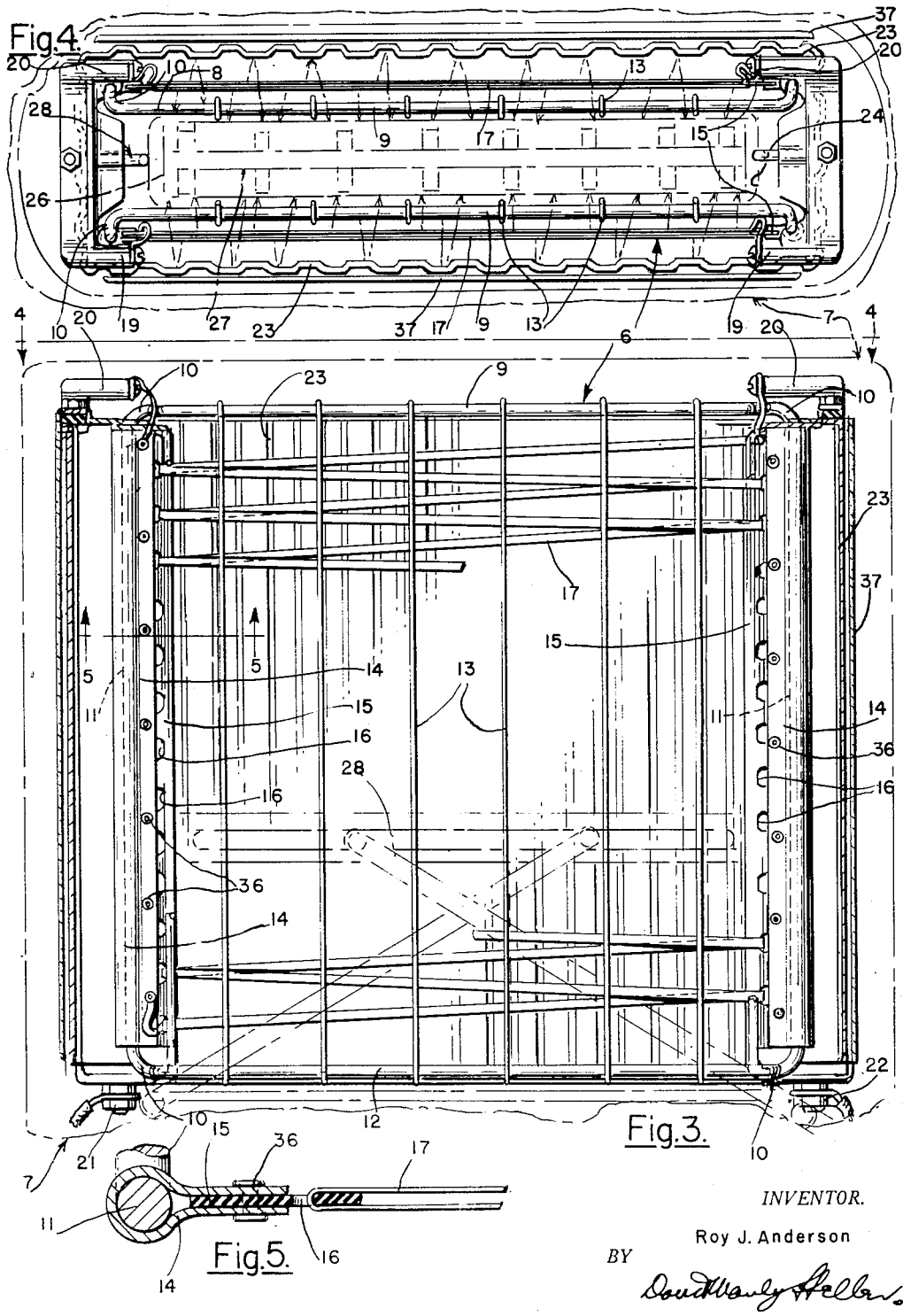

INVENTOR.
Roy J. Anderson
BY
Attorney

Patented Apr. 10, 1951

2,548,511

UNITED STATES PATENT OFFICE 2,548,511

ELECTRIC TOASTER

Roy J. Anderson, Chicago, Ill.

Application December 13, 1948, Serial No. 65,051

1 Claim. (Cl. 219—19)

My invention relates to electrical heating elements for ovens, toasters, and the like.

A most important object of my invention is to provide an electrical heating element for ovens, toasters, and the like that by means of improved insulation methods in connection therewith holds and maintains the heat within the oven where it properly belongs.

A further important object of my invention is to provide an electrical toaster element for ovens and the like wherein the heating element is laced under tension over an open grid, thus dispensing with the intermediate insulating or mica panel used in common practice with toasters and the like, and allowing the utilization of both direct and reflected heat in the toasting or cooking process.

A still further object of my invention is to provide electrical heating elements for ovens, toasters, and the like wherein a heating element is laced under tension over an open grid in such a manner that when heated the tension will be decreased and the heating element not become slack as would ordinarily be the case.

A further object of my invention is to provide electrical heating elements for ovens, toasters, and the like wherein the heating element consists of a ribbon-type element of resistance which does not become red when heated and which therefore effects considerable saving on the amperage required to operate.

A still further object of my invention is to provide electrical heating elements for ovens, toasters, and the like which are mounted close to the article to be toasted, and which are confined in an enclosure of such dimensions as to reduce the volume of the said enclosure to an extent which will result in a smaller column of air to be heated and thus permitting the use of non-glowing types of heating elements.

A still further object of my invention is to provide electrical elements for ovens, toasters, and the like which, used in connection with automatic timing means will maintain a more constant heating temperature within the toaster or oven than appears possible with toasters and ovens in present use.

A further object of my invention is to provide an electrical heating element for ovens, toasters, and the like that is simply designed and which may be economically produced in large quantities.

A further object of my invention is to provide a modification to the toaster unit thereof which is made removable by the use of split-pin type attaching elements on the toaster unit in connection with socket elements within the oven recess.

Other objects and advantages inherent in my invention will be disclosed in the following description and the accompanying illustrations in which like parts are designated by like numerals and in which:

Fig. 1 is a perspective view of a bread toaster having parts cut and broken away to show my electrical heating element mounted therein in association with automatic timing and toast elevating means.

Fig. 2 is an enlarged cross-sectional view of my invention taken substantially on line 2—2 on Fig. 1.

Fig. 3 is a transverse cross-sectional view of my invention taken substantially on line 3—3 on Fig. 2.

Fig. 4 is a top view of my invention taken looking in the direction of arrows 4—4 on Fig. 3.

Fig. 5 is an enlarged fragmentary cross-sectional view of the heating element connecting means of my invention.

Fig. 5b is a fragmentary cross-sectional view of the modification of my invention taken substantially on line 5b—5b on Fig. 5a.

Figure 5A:
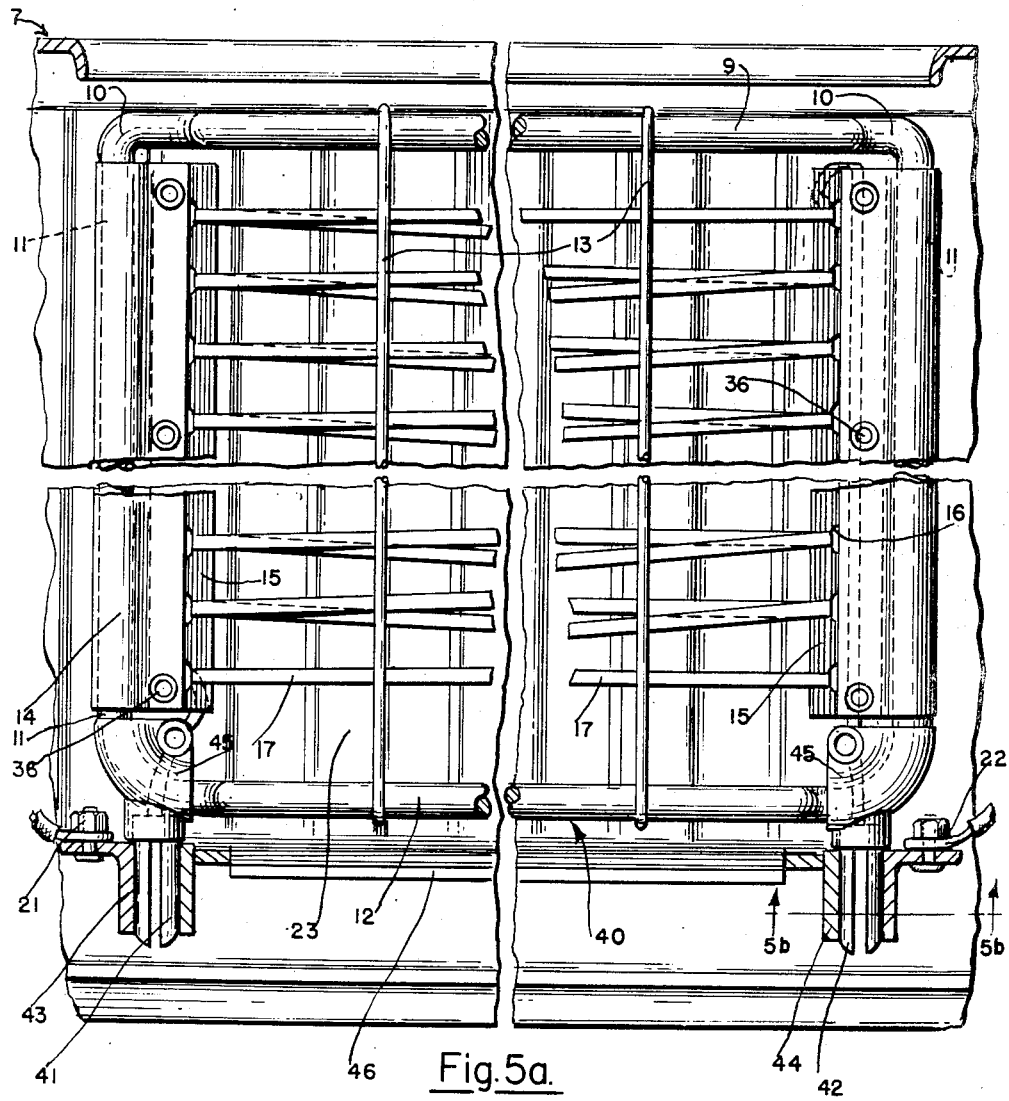
Fig. 5a is a modification of the heating element of my invention showing plug in or split-pin attaching and electrical connecting means thereon.

Referring to the illustrations, the electrical toaster element of my invention is generally designated 6 and is shown in the various views mounted within the toaster unit enclosure or oven 24 of an automatic toaster assembly 7. The said electrical element 6 consists of an element-supporting grid 8 having a top portion 9, offset bent portions 10, end portions 11, and a bottom portion 12. Guard wire elements 13 are mounted between top and bottom portions 9 and 12 of element-supporting grid 8 and serve to keep the bread slice designated 26 from contact with the electrical heating element 8. Element-supporting brackets 14 are mounted on the vertical end portions 11 and narrow insulator strips 15 which may be of mica are attached thereto by rivets 36. The said insulator strips 15 are provided with spaced lacing holes 16 to permit a ribbon-type heating element 17 to be laced under tension between the end portions 11 of element supporting grid 8. During the element lacing operation the said end portions 11 are sprung inwardly toward one another to insure a tightly strung heating element 17 in normal form upon element-supporting grid 8 so that the said heating element 17 will remain taut when released and also when heated. One end of the said heating element 17 is grounded at 18 to element-supporting bracket 14 which is provided with a ground connection terminal 19. The other end of heating element 17 is connected at 20 to the other source of electrical supply, the two terminals of which are designated 21 and 22. Heat reflector means 23, preferably consisting of corrugated aluminum or stainles steel plates, are mounted intermediate the element-supporting grid 8 and the outer walls of the toaster assembly 7. An air intake vent 46 is provided at the bottom of oven 24. The said heat reflector means 23 serves both to reflect heat from heating element 17 toward the bread slice 26 resulting in reverberation of the heat waves, at the same time acting as an insulator preventing heat escaping from the oven 24 of toaster asembly 7. Asbestos liners 37 mounted on the outer surface of heat reflector means 23 will further serve to insulate the heating element 17 and to capture the heat generated thereby within the toaster unit enclosure or oven 24 preventing heat dissipation and losses. The automatic toaster assembly 7 has a movable bread supporting rack 27 mounted within toaster unit enclosure 24 and is confined to a vertical movement by rack elevating assembly 28 in connection with manipulating and locking handle 30, rack operating arm 29, and spring means 31. A timing screw assembly 32 is vertically mounted on toaster assembly 7 to permit engagement of the screw therein with a locking lug means, not shown, mounted within rack operating arm 29 and operated by manipulating and locking handle 30. A time means designated 33 provides rotational motivation for the said timing screw assembly 32. Thermal link means 34 in connection with time set indicator 35 and bi-metallic strip 38 provides the time setting means for automatically operating timing screw assembly 32 in connection with the toaster element 6 of my invention.

Figure 5B:
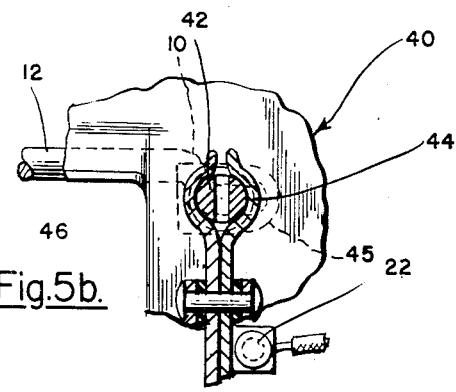

Figs. 5a and 5b illustrate a slight modification to the heating element means of my invention which is generally designated 40 and is similar in construction to the hereinabove described toaster unit designated 6 except for its attaching and electrical connecting means. Whereas the said toaster unit 6 is fixedly attached within oven confines 24, the modified toaster unit 40 is provided with bifurcated plug in or split-pin attaching elements 41 and 42, which together with socket elements 43—44 insulated from toaster assembly 7 by insulation means 45, serve as attaching and electrical connecting means for toaster unit 40. With the above described attaching means the said modified toaster unit 40 may be removably attached within oven 24 thus facilitating the cleaning of the toaster assembly 7 and simplifying the replacement of the toaster unit thereof when necessary.

To bring out the real nature of the heating element I am going to suggest the word "Black Heat" because that would really indicate the exact type it is. If I call the element a "Black-Heat" element I am definitely classifying a specific use for the element, as black-heat, is any heat that is invisible to the naked eye. This heat also comes within the range of cooking heat which is what this element is supposed to cover. "Black-Heat" runs from 700° F. down to the lower limit and anything at this temperature is barely visible in darkness.

As is well known, the lowest cooking temperature is about 300° F. and the highest is 450° F. The temperature of the heating element must be greater as there is a certain airgap between toast and source of heat and as intensity of radiation drops off relative to the distance from source of heat, hence it requires a very small distance therebetween for heat intensity to drop from 885° to 450°.

I call my heating element "The Taut Wire Open Type" heating element, because it maintains the hot wires tight at all times, and in a very narrow plane about one thirty-second of an inch thick and because there is no sheet mica intermediate the space occupied by the hot wires, but only narrow strips of mica at each end of the heating element by which the heating element is held in place. The absence of a large supporting sheet of mica gives less bulk to the heating element and less material to be heated up at each toasting operation, therefore, this element heats up quickly and loses its stored up heat quickly, and since the lining inside the oven is of very thin aluminum about .008" thick, it reflects the heat back through the heating element to the bread and because it contains a minimum of heat-absorbing metal it reaches the heat saturation point in the shortest possible time, thus bringing the inside of the oven to toasting temperature far faster than common bread toasting ovens.

By using a thin asbestos sheet between the inner lining and the main toaster wall the heat built up in the inner lining is prevented from rapidly passing into the outer oven wall, as it would do if there were only an air space between the two walls. The said sheet asbestos also simplifies construction by preventing contact between the oven lining, which in present day toasters is very hot, and the main oven, with my construction will be relatively cool. By keeping the temperature of the heating element about one half of the usual heating temperature, the lining in the oven will not be warped or burned because of too much heat striking it from the element, thus making it possible to mount this low temperature element closer to the wall. In this way about 885° F. is needed, as compared to the usual 2000° in common toasters, which results in about 450° F. directed toward the slice of bread to be toasted, which, incidentally is the ideal way to cook any kind of food.

Thus, by reducing the volume of air in the oven, moving elements nearer the slice of bread and by restricting the flow of air coming in at the bottom of the oven, my heating element is capable of toasting bread in half the usual time by eliminating pre-heating time when starting with a cold toaster.

In this connection I will say the advantages of my isolated oven units are that heat is held in the oven where it properly belongs, and furthermore the heat that has gone into the oven frame is prevented from returning to the oven. This feature is very important in cutting down pre-heating time, if not eliminating it altogether. A further important advantage of my heating element resides in the capacity for performing all toasting operations in the same space of time, including the first, or cold toasting operation. With my heating element expensive, trouble-making, and variable timing equipment with thermostat controls will not be needed. Also, in the heating element a big saving in manufacturing costs is effected because it requires only about one-fifth of the usual amount of expensive sheet mica or the like in making the heating element. With this new combination of heating element and oven cost, I provide an inner wall reflecting heat from a thin reflector surface through an open type of heating element, thus, increasing the effective heat wave reverberation in the oven. And the light weight of the wall lining is quick to absorb heat and reflect that heat, because it is insulated by air space from the main part of the oven. There is likewise a smaller amount of air in the oven to be heated up, requiring less heat and of course less time to heat up, thus speeding up the toasting operation. Because my heating element has very little mica, it heats up quickly and cools off rapidly—this is the reverse of the mica wound elements, as mica is very slow to heat and far slower to cool off. Also, the hotter the oven temperature must be, the longer it takes to cool off. Thus my low temperature heating element provides quick heating and quick cooling in the toaster oven.

Although my invention has been described, the terms used are to be deemed terms of description rather than terms of limitation, my intention being to retain the right to all mechanical equivalents of the structural elements depicted, provided they fall within the purview of the appended claim.

Having thus disclosed and revealed my invention, what I claim as new and desire to secure by Letters Patent is:

An electric toaster, comprising an oven housing, insulation means secured within the confines of the said oven housing adjacent a pair of oppositely disposed walls thereof, corrugated reflector means mounted in front of the said insulation means, plug-in electric socket means in the base of the said oven housing, and removable grill-like heating units mounted adjacent and between the said insulation means and provided with terminal pin means engaging the said plug-in socket means, the said grill-like heating units, comprising a tensioned wire frame-work, dielectric means secured to two opposed laterals of the said frame-work, ribbon heating means sinuously laced through openings in the said dielectric means, and guard wire means encircling the remaining opposed laterals of the said frame-work.

ROY J. ANDERSON.

REFERENCES CITED

The following references are of record in the file of this patent:

UNITED STATES PATENTS

| Number | Name | Date |
|---|---|---|
| 533,795 | Edwards | Feb. 5, 1895 |
| 1,102,393 | Denhard | July 7, 1914 |
| 1,561,309 | Colby | Nov. 10, 1925 |
| 1,820,885 | Le Vine | Aug. 25, 1931 |
| 1,900,249 | Miller et al. | Mar. 7, 1933 |
| 1,900,318 | Van Valkenburg et al. | Mar. 7, 1933 |
| 1,955,026 | Savage | Apr. 17, 1934 |
| 2,163,036 | Happe | June 20, 1939 |
| 2,316,699 | Myers | Apr. 13, 1943 |
| 2,459,170 | Koci | Jan. 18, 1949 |
| 2,462,607 | Browne | Feb. 22, 1949 |
| 2,473,719 | McCullough | June 21, 1949 |
| 2,476,142 | Goddard | July 12, 1949 |